Nov. 4, 1952 — G. A. LASKO — 2,616,941

INDICATING APPARATUS

Filed July 13, 1949

INVENTOR.
GEORGE A. LASKO
BY
Faloey, Souther & Stottenburg

Patented Nov. 4, 1952

2,616,941

UNITED STATES PATENT OFFICE 2,616,941

INDICATING APPARATUS

George Anton Lasko, Toledo, Ohio

Application July 13, 1949, Serial No. 104,548

12 Claims. (Cl. 136—182)

This invention relates to indicating devices, more particularly to indicating devices utilizing light-reflecting surfaces, wherein the character or the visual effect of the reflected light is changed in a zone by a member controlled by the physical effect being measured to indicate a change therein.

The basic principle herein disclosed is applicable to apparatus of various kinds wherein a change in a physical effect is to be indicated to an observer, for example, liquid level indicating devices suitable for use with batteries, time indicating devices, etc. The construction of apparatus including the basic principle can be varied widely, including various forms of the reflecting surfaces in a body of transparent material and the direction of movement of the indicating element with reference to such reflecting surface. The reflecting surface may take the general form of a prism, a cone or a torus and the direction of movement of the indicating element may be transverse or parallel to the axis of the reflecting member.

It is, therefore, a principal object of this invention to provide an indicating device wherein reflected light from a fixed reflecting surface in a body of transparent material has its characteristics changed by the movable element under control of a primary physical effect to indicate to an observer a change in the condition of the physical effect being indicated.

It is a further object to provide an indicating device wherein impinging light entering a front face of a mass of transparent material is reflected by an integral reflecting surface against a movable indicating element controlled by a primary physical effect to have its characteristics changed thereby and to make visible to an observer, viewing the element through the front face, the change in position of the indicating element to indicate the condition of the physical effect.

It is a further object to provide a device suitable for use with a dark interior such as a storage battery container for indicating electrolyte level in the container wherein all the light enters the device through the front surface of a transparent body to give an indication of the level similar to an expanding and contracting iris.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Figure 1:
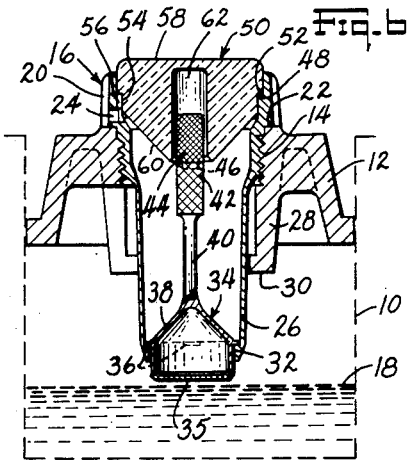
Fig. 1 is a sectional elevation of the invention as applied to an indicator for the electrolyte level in a storage battery.

Referring to the drawings, particularly to Fig. 1, a battery container 10 of opaque material is shown having an opaque cover 12 fitted into the top end thereof and provided with a threaded aperture 14, into which is fitted in threaded relation a vent plug 16, which may be manually removed from the cover 12 to replenish the electrolyte 18 in the container 10. The vent plug 16 is provided with hand holds 20 on its perimeter which terminate at a shoulder 22 abutting against the upper surface of the cover 12 when the plug is fitted into the threaded aperture, which is closed thereby except for a vent aperture 24 which pierces the cap 16 above the shoulder 22 to allow the escape of entrapped gases in the container 10.

The vent plug 16 is of tubular construction of translucent or opaque material having a depending portion 26 extending a substantial distance into the container 10 to below the normal level of the electrolyte as determined by an operator by filling up to the "star level" established by the lower end 28 of a depending portion 30 on the cover 12, which is of a tubular construction of approximately the same diameter as the threaded aperture 14 as is well known in the art. The depending portion 26 is preferably of integral construction with the threaded portion of the plug 16, and is slightly constricted below it and tapering slightly as shown in Fig. 1. At the lower open end of the depending portion, an inwardly extending flange 32 is provided which forms a stop for a hollow float member 34 positioned within the flange and provided adjacent a central location with external nibs 36 which rest on the flange 32 to form the stop for the lowermost position of the float. A bottom member 35 is preferably cemented in position to seal the hollow portion of the float from the electrolyte in the cell.

As the float member 34 moves upwardly under the influence of the electrolyte, it is guided within the depending tubular portion 26 by the external nibs 36 in the tapered portion thereof. Above the nibs 36, the float member is given a hollow conical formation 38 which terminates in an upwardly extending stem 40, positioned substantially concentrically with the vertical axis of the depending portion 26. On the upper end of the stem 40, a pair of longitudinally disposed transparent colored sections 42 and 44 are provided which are formed with right angle pyramidal faces 45 adapted to reflect light impinging upon them, back in the same direction and also to transmit light therethrough. The pyramidal faces are preferably in parallel juxtaposition two for each of the sections 42 and 44, which are made of transparent material having different colors for contrast, preferably green for section 42 and red for section 44. The element 42 is preferably molded integral with the stem 40, while the element 44 is preferably molded separately and cemented to the element 42 with an interengaging tongue and slot arrangement 46 being provided for great strength. The elements 42 and 44 are positioned approximately adjacent the level of the threaded engagement 14 of the plug 16, as will be described in detail hereinafter.

Adjacent the upper end of the tubular vent plug 16, an internal shoulder 48 is provided, upon which is seated a transparent member 50 by means of an external shoulder 52. The smaller portion 54 of the transparent member 50 fits snugly into the vent plug tube and the whole is permanently cemented together. Adjacent the aperture 24 which forms a vent for the plug, the shoulder 52 is recessed to form a clearance 56 to allow escape of entrapped gases from the container 10.

The transparent member 50 is provided with a flat front face 58 and with a conical rear face 60 having a 45 degree angle with the front face, from which it is spaced a substantial distance to provide two approximately equal zones, the first being adjacent the conical section and the second adjacent the cylindrical section which is uppermost. The two sections, in turn, are approximately equal to the lengths of the transparent colored sections 42 and 44 located at the top end of the stem 40, whose interaction with the two sections will be described further hereinafter.

The conical section 60 is truncated at its lower end and terminates in a relatively sharp edge about a central well 62 having its bottom adjacent the front face 58 but not piercing it as shown. The concentric well 62 is of sufficient vertical dimension to co-operate with the two zones hereinbefore described and is positioned in the plug 16, so that when the float 34 is in its lowermost position with the nibs 36 resting on the internal shoulder 32, the upper colored (red) element 44 is positioned in the first zone as is clearly shown in Fig. 4.

Figure 3:
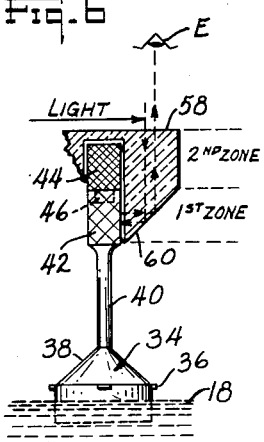
Fig. 3 is a schematic illustration of the path of light used in the indicating device.

When the float 34 is in uppermost position, such as is obtained when an operator fills the battery cell with water to bring the electrolyte level to the "star level" as determined by the lower end 30 of the depending portion 28 of the cover 12, the colored element 44 will be moved upwardly into the well 62 to touch its bottom, to place the colored element (green) 42 into the first zone, as is clearly shown in Fig. 3. Intermediate positions of the float between these extremes may be had, depending upon the electrolyte level in the cell container 10.

Figure 4:
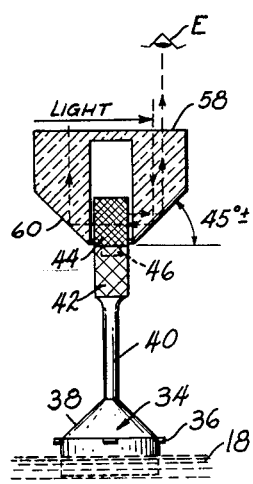
Fig. 4 is a view similar to Fig. 3 with the indicating element in another position.
Figure 2:
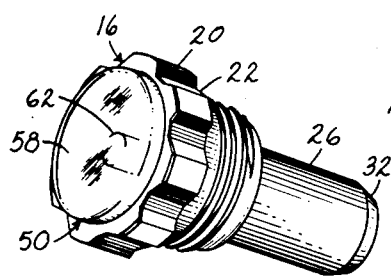
Fig. 2 is an isometric view of the vent plug for the battery cell as shown in Fig. 1.

Referring to Figs. 3 and 4, it will be noted that the light which is utilized in the use of the indicating device enters the front face 58 of the transparent member 50 and is reflected toward the colored elements 42 and 44 in the first zone, the light then being either reflected back by the pyramidal faces or is transmitted through the colored element in the said zone, thereby becoming visible to the eye E of the operator by reflected light from the oblique lower face 60 of the transparent member 50. The transparent member is molded of suitable stable, acid-resistant material such as acrylic plastic resin, commonly known in the trade as Plexiglas or Lucite which is water-white and has an index of refraction of 1.48 to 1.50 with a light transmitting efficiency of approximately 90 per cent. This material has excellent transparency and is well suited for use in a device of this kind. To the eye E of an observer, the light visible to him is colored by the action of the colored element in the first zone, the colored element in the second zone not being visible.

Figure 5:
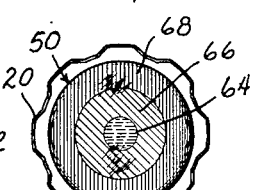
Fig. 5 is a plan view of the vent plug shown in Figs. 1 and 2 showing the iris effect.

Inasmuch as the oblique face 60 is in the form of a cone, the colored portion seen through the front face 58 will be in the form of an iris comprising a pair of bordering zones of contrasting colors or one solid color and the central well 62 will be blank and appear as a pupil in the human eye. This is shown in Fig. 5 with the float in an intermediate position between the uppermost and the lowermost position, the central portion or pupil 64 being relatively dark and colorless, while the intermediate colored ring 66 concentric with the pupil 64 is colored green and the outer colored ring 68 is red in color. As the float moves to the lowermost position shown in Fig. 4, the ring about the pupil 64 will be all red, or with the float in uppermost position shown in Fig. 3, the ring about the pupil 64 will be all green.

As the float 34 moves upwardly, the green will expand outwardly from the pupil 64 by increasing its diameter, until the zone is colored all green, then as the float 34 moves downwardly from its uppermost position, the green zone will recede inwardly toward the pupil, while the red zone will contrast inwardly from the periphery and the green zone will recede toward the pupil until at the lowermost position, the zone will be all red in color.

Figure 7:
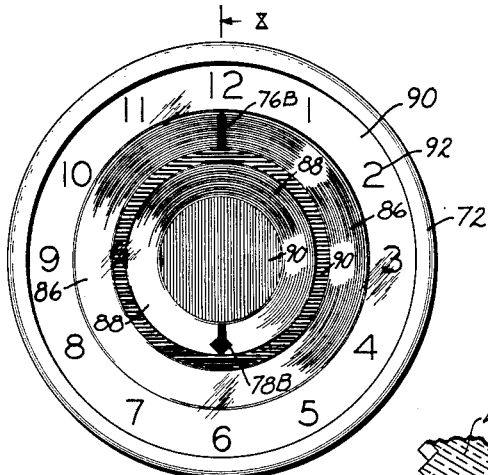
Fig. 7 is an elevational view of a modification of the device.
Figures 6, 6A:
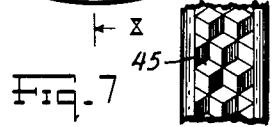
Fig. 6 is a sectional elevation of a portion of the indicating element.
Fig. 6A is an elevational view taken from side of Fig. 6.
Figure 8:
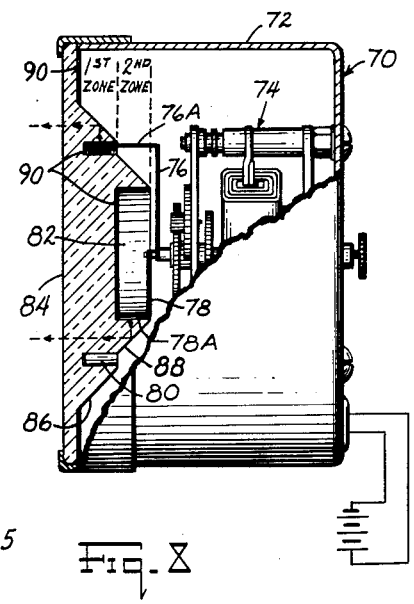
Fig. 8 is a sectional elevation taken along lines 8—8 of Fig. 7.

This interaction of the red and green zones will indicate to an operator the condition of the electrolyte level in the battery cell without requiring the removal of the entire vent plug. It will be noted in this device that the movement of the movable indicating elements 42 and 44, as actuated by the float 34 responsive to the primary physical effect being measured, namely, the electrolyte level in the battery cell, is parallel to the axis of the reflecting face 60 of the transparent member 50 which, in this modification, has the general shape of a cone to give an iris effect to the indicating means. In Figs. 7 and 8 another modification is shown wherein the movement of the indicating element is transverse or in a plane perpendicular to that of the modification shown in the remaining figures already disclosed.

In the modification shown in Figs. 7 and 8, the indicating means of the invention is applied to a clock 70 having a case 72 and an operating mechanism 74 either electrical or spring-actuated which moves a minute hand 76 and an hour hand 78 in the well known manner. Both the minute and hour hands are provided with horizontal projecting elements 76A and 78A which are adapted to cooperate with annular horizontal faces 80 and 82 formed in the rear face of a transparent face member 84 as is best seen in Fig. 8.

The face member 84 is fitted into the case 72 in any desirable manner and is held in fixed position with reference to the hands to allow the horizontal portions to move in circular paths adjacent the annular faces 80 and 82, which are outwardly flanked by annular prisms 86 and 88 juxtaposed in stacked position to form contiguous zones as shown in Fig. 8, where the minute hand 76A, being elongated, extends to the forward first zone and the hour hand into the second zone, the two zones being displaced in the longitudinal direction of the axis of movement of the hands, with the hour hand zone positioned to the rear. The vertical faces of the transparent member 84 are preferably backed with opaque decorative material 90 which may be metal or paint, as desired, giving a bull's-eye appearance to the dial member 84 as viewed from the front, as shown in Fig. 7. Indicia 92 may be positioned in the dial member 84 in any convenient manner to contrast with the backing material 90.

When the clock face or dial member 84 is viewed from the front, as shown in Fig. 7, the horizontal portions 76A and 78A of the minute and hour hands will appear in vertical juxtaposition as reflections 76B and 78B as viewed from the oblique 45° faces of the annular prisms 86 and 88. As the hands move around the dial, the relation between the portions 76A and 78A will remain the same with reference to their respective reflections in the prism members, so that the hands will always appear as though radially mounted with reference to their center of movement. In this modification, the movements of the movable elements are transverse to the axis of the reflecting surface, or perpendicular to the plane of movement of the first modification disclosed. The front face member 84 is made of any transparent material, especially acrylic or polystyrene resins molded into the form desired.

It is to be understood that the above detailed description of the present invention is intended to disclose an embodiment thereof to those skilled in the art, but that the invention is not to be construed as limited in its application to the deails of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. The method of indicating the condition of a physical effect to be measured, comprising moving a member having indicia thereon, longitudinally through a zone adjacent a transparent member having a front face and a reflective oblique face, whereby light entering the front face of the transparent member is modified by the relation of the reflective oblique face and the indicia on the member in the zone to indicate the condition of the physical effect to an observer by the reflected light through the front face.

2. The method of indicating the condition of a physical effect variable between limits which comprises a pair of contrasting color zones viewed through a front face in the form of concentric bordering zones which with a change of the physical effect causes a change in the border between the zones to appear adjacent the center and expand outwardly to the periphery as the physical effect approaches one limit, being of substantially a solid color at the limit, and said border contracting inwardly with a change toward the other limit, being substantially the other solid color at the other limit.

3. The method of indicating the condition of a physical effect variable between limits, comprising expanding and contracting a border between two concentric zones of contrasting colors, which at one limit is of one solid color having expanded to the periphery from the center, and which at the other limit is the other solid color having contracted from the periphery to the center.

4. The method of indicating the condition of a physical effect variable between limits comprising moving a pair of contrasting colored elements through a zone of reflected light under the influence of the physical effect and taking a position responsive to the condition thereof, so that the reflected light in said zone is colored thereby to create a visual effect of concentric colored bands to an observer, the color of the reflected light in the zone being of one color at one of the limits of the physical effect and the other contrasting color at the other limit.

5. The method of indicating the condition of a physical effect variable between limits comprising moving a pair of contrasting colored elements along the axis of a conical reflector responsive to the condition of the physical effect, whereby the reflection of the colored elements to an observer in the conical reflector will comprise a pair of concentric bordering zones expanding and contracting so that at one limit of the physical effect the visible color is solid having expanded toward the periphery of the reflector, and at the other limit the visible color is the other solid color having contracted from the periphery toward the center.

6. In an indicating device, a movable member adapted to take a position in accordance with a physical effect being measured, contrasting zones on the movable member to indicate the condition of the physical effect, means cooperating with the physical effect and the movable member to effect movement of the movable member in accordance with changes of the physical effect being measured, and a body of transparent material having a front face and an oblique rear face cooperating with the movable member adjacent the zones thereon, whereby light entering the front face is reflected by the oblique face against the zone on the movable member adjacent thereto as positioned by the means responsive to the physical effect moving the movable member, so that an observer can ascertain the status of the zone by reflected light from the oblique face as observed through the front face.

7. In an indicating device, a conical reflector, a movable member adapted to take a position in accordance with the physical effect being measured movable along the axis of the cone of the reflector, contrasting zones on the movable member to indicate the condition of the physical effect, and means cooperating with the physical effect to move the movable member in accordance with the condition of the physical effect, whereby the reflected light of the reflector cooperating with the contrasting zones on the movable member will create a ring-like effect visible in the reflector through the front face expanding and contracting toward or away from the axis of the cone of the reflector to indicate to the observer the condition of the physical effect.

8. In a battery electrolyte indicating device, a tubular shell of acid-resisting material having a threaded portion adjacent its upper end to cooperate with the opening in a battery cover, a depending tapering portion extending below the normal level of the battery electrolyte, a float member positioned in the depending portion and adapted to be guided thereby as it responds to the level of the electrolyte in the battery, a pair of colored elements cooperating with the float and movable therewith in response to change in the electrolyte level, a truncated conical reflector having its axis symmetrical with the tubular shell and adapted to be mounted therein to seal the same adjacent its upper end, the reflector reflecting light in the zone of the limits of movement of the colored elements, whereby an observer can ascertain the condition of the level of the electrolyte by observing the reflected light in the conical reflector.

9. The combination set forth in claim 8 being further characterized by having the conical reflector made as a truncated cone of transparent material having a central well in which the colored elements are movable.

10. In an indicating device, a transparent dial member adapted to be viewed from the front side, a cylindrical surface on the rear of said dial member having an axis substantially normal to the front side, a prismatic reflecting surface flanking the cylindrical surface being formed integral with the dial member, an indicating element adapted to move concentrically with the cylindrical surface in close juxtaposition thereto, whereby the reflection of light from the front side, will make the indicating element visible to an observer through the front side of the dial member, and means to move the indicating element in accordance with a change in a physical effect.

11. The device defined in claim 10 further characterized by having a second cylindrical surface in concentric relation with the first being also flanked by a reflecting surface, a second indicating element cooperating with the second cylindrical surface, said cylindrical surface being displaced in a radial direction.

12. The device defined in claim 11 being further characterized by having the two cylindrical surfaces displaced longitudinally into two separate contiguous zones.

GEORGE ANTON LASKO.

REFERENCES CITED

The following references are of record in the file of this patent:

UNITED STATES PATENTS

| Number | Name | Date |
| --- | --- | --- |
| 461,370 | Seidensticker | Oct. 13, 1891 |
| 954,423 | Cramer | Apr. 12, 1910 |
| 1,485,772 | Du Pont | Mar. 4, 1924 |
| 1,703,233 | Hall et al. | Feb. 26, 1929 |
| 1,878,867 | Leukhardt, Jr. | Sept. 20, 1932 |
| 1,883,971 | Kryzanowsky | Oct. 25, 1932 |
| 2,123,479 | Spencer | July 12, 1938 |
| 2,218,074 | Smith | Oct. 15, 1940 |
| 2,227,861 | Petrone | Jan. 7, 1941 |
| 2,301,460 | Sauer | Nov. 10, 1942 |
| 2,334,479 | Creager | Nov. 16, 1943 |